Patented Aug. 15, 1950

2,519,210

UNITED STATES PATENT OFFICE 2,519,210

PHYSICALLY STABLE CASTOR OIL SOLUBLE VICTORIA BLUE BO AND A PROCESS OF MAKING IT

Phillip Jerome Wingate, Collins Park, Del., and Ralph Oliver Ranck, Carney's Point, N. J., assignors to E. I. du Pont de Nemours & Company, Wilmington, Del., a corporation of Delaware No Drawing. Application October 20, 1948, Serial No. 55,648

4 Claims. (Cl. 260—388)

This invention relates to an improved form of Victoria Pure Blue BO, which has been defined in U. S. Patent No. 2,422,445 as a dyestuff which is essentially the hydrochloride of tetraethyldiamino - diphenyl - ethyl - alpha - amino - naphthyl-methane. This improved form is soluble and stable in hot castor oil against crystallization.

The said U. S. patent discloses in detail the preparation of said color and teaches a special process for isolating it in a form which is soluble both in water and in castor oil. The importance of solubility in castor oil has been pointed out there as springing from the fact that in the manufacture of copying papers (so called "carbon papers") it has become customary in recent years to employ castor oil as the vehicle for preparing the colored coating for the paper.

The said castor oil soluble form of the color under discussion has come since to be known in the trade as Victoria Pure Blue BOC. Following the scheme of said U. S. Patent No. 2,422,445, it may be defined structurally by the formula $$[B].(HCl)_x$$

wherein $$[B]$$

represents the organic nucleus of the color, while the subscript $x$ is a number not less than 1.00 and not greater than 1.10. It has been observed however, that this color has a strong tendency to crystallize out of hot castor oil upon standing. Such tendency is noxious to the copying paper maker, inasmuch as it is the custom to prepare a coating ink, by heating the various ingredients in castor oil to about 190°–210° F., and to keep the mixture hot for several hours while it is being gradually consumed in the coating of paper.

However, if the dye crystallizes out, the coating ink becomes viscous and grainy, and will not spread uniformly and smoothly over the paper.

It is accordingly an object of this invention to further modify the composition or form of Victoria Pure Blue BOC whereby to endow it with stability against crystal growth in hot castor oil, without impeding its other principal qualities, namely solubility in water and in castor oil. Other and further important objects of this invention will become apparent as the description proceeds.

Now, according to our invention, these objects are achieved by incorporating in the wet, precipitated dye, after the salting-out step and before drying, a small quantity (2 to 6% by weight based on the dry weight of color) of a polyhydroxy aliphatic compound, such as glycol, glycerine or pentaerythritol, and then drying the color and grinding it in the usual manner. We find that the color thus treated possesses the same excellent solubility in water and in castor oil as is characteristic of Victoria Pure Blue BOC, but possesses the additional advantage of being stable against crystal growth in hot castor oil in the temperature ranges of its normal use.

It is conceivable that this novel effect is due to the formation of a loose compound between the dye and the polyhydroxy compound, say glycerine, in a manner similar to the formation of hydrates of crystalline substances. But we do not desire to limit this invention to this or any other theory of action. Suffice it to say that we have kept solutions of our novel color in castor oil for as much as 24 hours, at temperatures between 180° and 220° F., and found the solution fluid and substantially free of crystals, whereas when our novel dye compound was replaced by ordinary Victoria Pure Blue BOC (that is one not treated with polyhydroxy compounds), crystallization after ½ hour was sufficiently bad to make the mass viscous, gritty, and unsuitable for the production of "carbon paper."

Without limiting our invention to any particular procedure, we offer the following examples as illustrating our preferred mode of operation. Parts mentioned are by weight.

Example 1.

100 parts by weight of Victoria Pure Blue BOC (dry basis), obtained as a wet "tar" by salting the dye solution as described in Example 1 of U. S. 2,422,445, were mixed with 4 parts by weight of glycerine and the mixture was dried by heating in vacuo at 80° C. until the resulting dye contained only 0.5 to 3% water.

For testing, 2 parts of the above dye were ground, mixed with 10 parts of castor oil and heated at 220° F. for 4 hours. No appreciable growth of color crystals was observed. The solution remained smooth and free flowing.

For comparison, a similar castor oil solution was prepared using Victoria Pure Blue BOC which had not been treated with glycerine. In this case, abundant growth of crystals was observed in the castor oil and the mixture became viscous and grainy.

Example 2.

The procedure of Example 1 was repeated except that the glycerine was replaced by an equal weight of pentaerythritol. The stabilized dye obtained in this manner did not grow crystals when heated in castor oil.

*Example 3*

The procedure of Example 1 was repeated in a series of experiments, except that the glycerine was replaced by an equal weight of glycol, diethylene glycol or sorbitol, respectively. In every case the dye so treated showed great resistance to crystal growth in hot castor oil.

In a similar manner other polyhydroxy compounds were tested, including glyceryl-chlorhydrin and 2-methyl-2,4-pentanediol. All showed the same tendency to inhibit crystal growth.

We claim as our invention:

1. A process for improving the stability against crystal growth of the castor-oil-soluble grade of Victoria Pure Blue BO, which comprises incorporating into the wet, salted-out color, prior to drying, from 2% to 6% by weight (based on the weight of dry color) of an aliphatic polyhydroxy compound selected from the group consisting of glycol, glycerine, pentaerythritol, diethylene glycol, sorbitol and 2-methyl-2,4-pentanediol, and then drying the color under a vacuum, whereby to retain the polyhydroxy compound in the color.

2. As a new composition of matter, a physically stable castor-oil-soluble form of Victoria Pure Blue BO whose molecules are intimately associated with an aliphatic polyhydroxy compound selected from the group consisting of glycol, glycerine, pentaerythritol, diethylene glycol, sorbitol and 2-methyl-2,4-pentanediol, the quantity of said polyhydroxy compound being from 2 to 6% by weight based on the dry weight of the color, said composition being characterized by stability against crystal growth in hot castor oil.

3. A process for improving the stability against crystal growth of the castor-oil-soluble grade of Victoria Pure Blue BO, which comprises incorporating into the wet, salted-out color, prior to drying, about 4% by weight of glycerine (based on the weight of dry color) and then drying the treated press cake under vacuum, whereby to drive off substantially all of its water while retaining the glycerine.

4. As a new composition of matter, a physically stable castor oil soluble form of Victoria Pure Blue BO whose molecules are intimately associated with glycerine, the quantity of glycerine being from 2 to 6% by weight based on the dry weight of the color, said composition being characterized by stability against crystal growth in hot castor oil.

PHILLIP JEROME WINGATE.
RALPH OLIVER RANCK.

The following references are of record in the file of this patent:

REFERENCES CITED

UNITED STATES PATENTS

| Number | Name | Date |
|---|---|---|
| 1,848,077 | Huffman | Mar. 1, 1932 |
| 2,086,745 | Sell | July 13, 1937 |
| 2,202,066 | Platt | May 28, 1940 |
| 2,208,551 | Waters | July 16, 1940 |
| 2,375,230 | Kline | May 8, 1945 |
| 2,361,505 | Sheridan | Oct. 31, 1944 |
| 2,435,905 | Shaefer | Feb. 10, 1948 |